(12) United States Patent
Kim et al.

(10) Patent No.: US 9,168,823 B2
(45) Date of Patent: Oct. 27, 2015

(54) TRANSMISSION SYSTEM OF HYBRID ELECTRIC VEHICLE

(71) Applicant: Hyundai Motor Company, Seoul (KR)

(72) Inventors: Baekyu Kim, Suwon-si (KR); SungGon Byun, Anyang-si (KR); Hyunsup Kim, Seoul (KR); Hee Ra Lee, Anyang-si (KR); Insup Kim, Anyang-si (KR); Seok Joon Kim, Yongin-si (KR); Chulmin Ahn, Busan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/139,060

(22) Filed: Dec. 23, 2013

(65) Prior Publication Data

US 2014/0378258 A1 Dec. 25, 2014

(30) Foreign Application Priority Data

Jun. 24, 2013 (KR) .................... 10-2013-0072278

(51) Int. Cl.
*F16H 3/72* (2006.01)
*B60K 6/365* (2007.10)
*B60K 6/387* (2007.10)
*B60K 6/442* (2007.10)

(52) U.S. Cl.
CPC ............ *B60K 6/365* (2013.01); *B60K 6/387* (2013.01); *B60K 6/442* (2013.01); *Y10S 903/902* (2013.01)

(58) Field of Classification Search
CPC ......................................... B60K 6/42
See application file for complete search history.

(56) References Cited

U.S. PATENT DOCUMENTS 8,337,352 B2 12/2012 Morrow et al.
8,430,190 B2 4/2013 Honda et al.
2013/0260936 A1* 10/2013 Takei et al. ............... 475/5

FOREIGN PATENT DOCUMENTS

JP 2003-63260 A 3/2003
JP 2012116435 A * 6/2012

OTHER PUBLICATIONS

Machine translation of JP 2012116435 A.*

* cited by examiner

*Primary Examiner* — Dirk Wright
(74) *Attorney, Agent, or Firm* — Morgan, Lewis & Bockius LLP (57) ABSTRACT

A transmission system of a hybrid electric vehicle may include an input shaft connected to an engine, first and second motors/generators disposed on a transmission housing, a planetary gear set disposed on the input shaft and having three rotation elements, of which one rotation element is connected to the transmission housing, another rotation element is connected to the input shaft, and the other rotation element is connected to the first motor/generator and operated as an output element, a first output gear disposed on the input shaft without rotational interference therebetween and connected to the second motor/generator, a second output gear disposed on the input shaft without rotational interference therebetween, and a first clutch selectively connecting the second output gear to the input shaft.

15 Claims, 6 Drawing Sheets

| Drive mode | | CL1 | CL2 |
|---|---|---|---|
| EV mode | | | |
| Starting of engine | | | |
| Continuous mode | | | |
| Parallel mode | Direct-coupling (Including UD, 1:1, OD) | ○ | |
| | OD | | ○ |

TRANSMISSION SYSTEM OF HYBRID ELECTRIC VEHICLE

CROSS-REFERENCE TO RELATED APPLICATION

The present application claims priority of Korean Patent Application Number 10-2013-0072278 filed on Jun. 24, 2013, the entire contents of which application is incorporated herein for all purposes by this reference.

BACKGROUND OF INVENTION

1. Field of Invention

The present invention relates to a transmission system of a hybrid electric vehicle. More particularly, the present invention relates to a transmission system of a hybrid electric vehicle that can achieve EV mode, continuous mode and parallel mode including direct-coupling and OD.

2. Description of Related Art

Generally, a hybrid vehicle is a vehicle which uses two different power sources efficiently. Such a hybrid electric vehicle typically uses an engine and a motor/generator. The hybrid electric vehicle uses the motor/generator having relatively better low-speed torque characteristics as a main power source at a low-speed and uses an engine having relatively better high-speed torque characteristics as a main power source at a high-speed. Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type. A torque delivery apparatus such as clutches and brakes for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle. Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear sets, and a battery used as a power source of the motor/generators.

The power transmission system of the multi-mode type has different operating mechanisms depend on connections of the planetary gear sets, the motor/generators, and the torque delivery apparatus. In addition, the power transmission system of the multi-mode type has different features such a durability, power delivery efficiency, and size depend on the connections of the planetary gear sets, the motor/generators, and the torque delivery apparatus. Therefore, designs for the connection structure of the power transmission system of a hybrid electric vehicle are also under continuous investigation to achieve robust and compact power transmission system having no power loss.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a transmission system of a hybrid electric vehicle having advantages of achieving EV mode, continuous mode and parallel mode including direct-coupling and OD by disposing two motor/generators and two clutches on an input shaft.

In addition, the present invention has been made in an effort to provide a transmission system of a hybrid electric vehicle having further advantages of enhancing fuel economy by not using clutches at modes other than parallel mode. Moreover, the present invention has been made in an effort to provide a transmission system of a hybrid electric vehicle having further advantages of achieving speed-reduction gear ratio for starting an engine through a planetary gear set. Further, the present invention has been made in an effort to provide a transmission system of a hybrid electric vehicle having further advantages of achieving OD (Overdrive) using a planetary gear set. Therefore, a conventional output gear set for achieving the OD can be removed and a length of a transmission may be shortened.

A transmission system of a hybrid electric vehicle according to various aspects of the present invention may include: an input shaft connected to an engine; first and second motors/generators disposed on a transmission housing; a planetary gear set disposed on the input shaft and having three rotation elements, wherein one rotation element is connected to the transmission housing, another rotation element is connected to the input shaft, and the other rotation element is connected to the first motor/generator and operated as an output element; a first output gear disposed on the input shaft without rotational interference therebetween and connected to the second motor/generator; a second output gear disposed on the input shaft without rotational interference therebetween; and a first clutch selectively connecting the second output gear to the input shaft.

The transmission system may further include a second clutch selectively connecting the second output gear to the other rotation element of the planetary gear set.

The planetary gear set may be a single pinion planetary gear set including a sun gear, a planet carrier and a ring gear as the three rotation elements thereof, wherein the sun gear is fixed to the transmission housing, the planet carrier is directly connected to the input shaft, and the ring gear is directly connected to the first motor/generator and is selectively connected to the second output gear through the second clutch.

The transmission system may further include a reduction speed gear unit including an intermediate shaft disposed substantially in parallel with the input shaft and disposed between the first and second output gears and a final reduction gear of a differential apparatus so as to transmit the torques of the first and second output gears to the differential apparatus. The reduction speed gear unit may include: a first intermediate gear disposed on the intermediate shaft and externally meshed with the first output gear; a second intermediate gear disposed on the intermediate shaft and externally meshed with the second output gear; and a drive gear disposed on the intermediate shaft and externally meshed with the final reduction gear of the differential apparatus.

The first and second output gears and the first and second clutches may be disposed between the planetary gear set and the engine.

A transmission system of a hybrid electric vehicle according to various other aspects of the present invention may include: an input shaft connected to an engine; first and second motors/generators disposed on a transmission housing; a planetary gear set disposed on the input shaft and having three rotation elements, wherein one rotation element is connected to the transmission housing, another rotation element is connected to the input shaft, and the other rotation element is connected to the first motor/generator; a first output gear connected to the second motor/generator and outputting torque; a second output gear outputting torque independently from the first output gear; and one clutch selectively connecting the second output gear to the other rotation element of the planetary gear set.

The transmission system may further include another clutch selectively connecting the second output gear to the input shaft.

The planetary gear set may be a single pinion planetary gear set including a sun gear, a planet carrier and a ring gear as the three rotation elements thereof, wherein the sun gear is fixed to the transmission housing, the planet carrier is directly connected to the input shaft, and the ring gear is directly connected to the first motor/generator and is selectively connected to the second output gear through the second clutch.

The transmission system may further include a reduction speed gear unit including an intermediate shaft disposed substantially in parallel with the input shaft and disposed between the first and second output gears and a final reduction gear of a differential apparatus so as to transmit the torques of the first and second output gears to the differential apparatus. The reduction speed gear unit may include: a first intermediate gear disposed on the intermediate shaft and externally meshed with the first output gear; a second intermediate gear disposed on the intermediate shaft and externally meshed with the second output gear; and a drive gear disposed on the intermediate shaft and externally meshed with the final reduction gear of the differential apparatus.

The first and second output gears, the one clutch and the another clutch may be disposed between the planetary gear set and the engine.

A transmission system of a hybrid electric vehicle according to still various other aspects of the present invention may include: an input shaft connected to an engine; first and second motor/generators disposed on a transmission housing; a planetary gear set including first, second, and third rotation elements, wherein the first rotation element is fixed to the transmission housing, the second rotation element is connected to the input shaft, and the third rotation element is connected to the first motor/generator; a first output gear connected to the second motor/generator and outputting torque; a second output gear outputting torque independently from the first output gear; and a first clutch selectively connecting the second output gear to the input shaft; and a second clutch selectively connecting the second output gear to the third rotation element of the planetary gear set.

The planetary gear set may be a single pinion planetary gear set, wherein the first rotation element is a sun gear, the second rotation element is a planet carrier, and the third rotation element is a ring gear.

The transmission system may further include a reduction speed gear unit including an intermediate shaft disposed substantially in parallel with the input shaft and disposed between the first and second output gears and a final reduction gear of a differential apparatus so as to transmit the torques of the first and second output gears to the differential apparatus. The reduction speed gear unit may include: a first intermediate gear disposed on the intermediate shaft and externally meshed with the first output gear; a second intermediate gear disposed on the intermediate shaft and externally meshed with the second output gear; and a drive gear disposed on the intermediate shaft and externally meshed with the final reduction gear of the differential apparatus.

The first and second output gears and the first and second clutches may be disposed between the planetary gear set and the engine.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the various embodiments will be omitted, and the same constituent elements are denoted by the same reference numerals in this specification. In the detailed description, ordinal numbers are used for distinguishing constituent elements having the same terms, and have no specific meanings.

Figure 1:
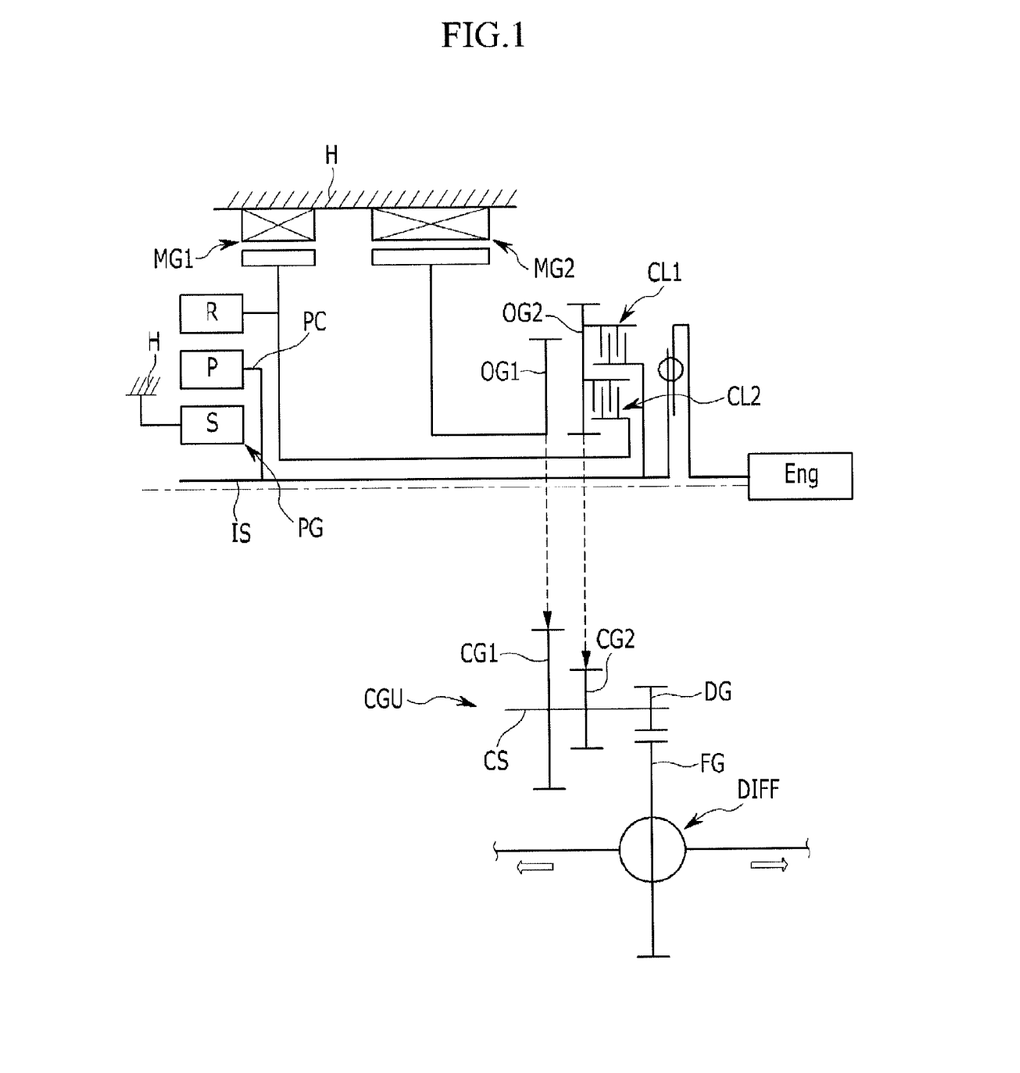
FIG. 1 is a schematic diagram of an exemplary transmission system of a hybrid electric vehicle according to the present invention.

FIG. 1 is a schematic diagram of a transmission system of a hybrid electric vehicle according to various embodiments of the present invention. Referring to FIG. 1, a transmission system of a hybrid electric vehicle changes torques of engine Eng and first and second motor/generators MG1 and MG2 according to running state of a vehicle and outputs the changed torque through an output gear OG.

The transmission system includes the first and second motor/generators MG1 and MG2, a planetary gear set PG, first and second output gears OG1 and OG2, first and second clutches CL1 and CL2 and a reduction speed gear unit CGU. The first motor/generator MG1 and the second motor/generator MG2 are independent power sources and each is operated as a motor and/or a generator.

The first motor/generator MG1 is directly connected to one rotation element of the planetary gear set PG so as to be operated as a start motor for starting the engine or to be operated as a generator that generates electricity by torque of the engine transmitted through the one rotation element. The second motor/generator MG2 is directly connected to the first output gear OG1 so as to be operated as a motor that supplies torque.

For this purpose, a stator of the first motor/generator MG1 and a stator of the second motor/generator MG2 are fixed to a transmission housing H, and a rotor of the first motor/generator MG1 and a rotor of the second motor/generator MG2 are connected respectively to the one rotation element of the planetary gear set PG and the first output gear OG1. The first and second motor/generators MG1 and MG2 and the planetary gear set PG are disposed on an input shaft IS.

In addition, the first and second clutches CL1 and CL2 may be conventional multi-plate friction elements of wet type that are operated by hydraulic pressure, and are frictional elements selectively connecting a rotation element with another rotation element.

Hereinafter, the transmission system of the hybrid electric vehicle according to the various embodiments of the present invention will be described in further detail.

The planetary gear set PG is a single pinion planetary gear set, and includes a sun gear S, a planet carrier PC rotatably supporting a pinion P externally meshed with the sun gear S, and a ring gear R internally meshed with the pinion P as rotation elements thereof. The sun gear S is fixed to the transmission housing H, the planet carrier PC is connected to the input shaft IS, and the ring gear R is operated as an output element and is connected to the first motor/generator MG1.

The first motor/generator MG1 is connected to the ring gear R of the planetary gear set PG so as to drive the ring gear R or to be operated as the generator by torque of the ring gear R. The second motor/generator MG2 is connected to the first output gear OG1 so as to directly transmit torque to the first output gear OG1.

The first clutch CL1 is disposed between the input shaft IS and the second output gear OG2 and selectively connects the input shaft IS and the second output gear OG2. Therefore, the first clutch CL1 transmits the torque of the engine Eng directly to the second output gear OG2. The second clutch CL2 is disposed between the ring gear R of the planetary gear set PG and the second output gear OG2 and selectively connects the ring gear R of the planetary gear set PG and the second output gear OG2. Therefore, the torque of the engine Eng is changed by the planetary gear set PG and the changed torque is input to the second output gear OG2.

Herein, the first and second output gears OG1 and OG2 and the first and second clutches CL1 and CL2 are disposed between the planetary gear set PG and the engine Eng. In addition, the first and second output gears OG1 and OG2 are connected to a final reduction gear FG of a differential apparatus DIFF through the reduction speed gear unit CGU.

The reduction speed gear unit CGU is positioned between the input shaft IS and the differential apparatus DIFF. The reduction speed gear unit CGU includes an intermediate shaft CS disposed in parallel or substantially in parallel with the input shaft IS, a first intermediate gear CG1 positioned at an end portion of the intermediate shaft CS and externally meshed with the first output gear OG1, and a second intermediate gear CG2 disposed at a middle portion of the intermediate shaft CS and externally meshed with the second output gear OG2. In addition, the reduction speed gear unit CGU further includes a drive gear DG positioned at the other end portion of the intermediate shaft CS and externally meshed with the final reduction gear FG of the differential apparatus DIFF.

Diameters of the first and second intermediate gears CG1 and CG2 are larger than a diameter of the drive gear DG. Therefore, the reduction speed gear unit CGU reduces speeds of the first and second output gears OG1 and OG2 and transmits the reduced speeds to the final reduction gear FG.

Figure 2:
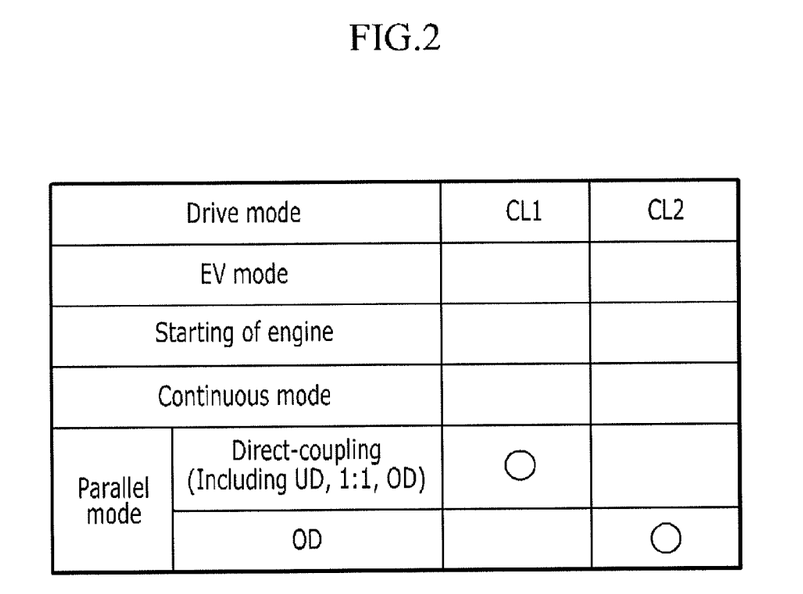
FIG. 2 is an operational chart of friction elements at each mode applied to an exemplary transmission system of a hybrid electric vehicle according to the present invention.

FIG. 2 is an operational chart of friction elements at each mode applied to a transmission system of a hybrid electric vehicle according to various embodiments of the present invention. Referring to FIG. 2, the transmission system of the hybrid electric vehicle can achieve EV mode, continuous mode, and parallel mode including direct-coupling and OD.

That is, the first and second clutches CL1 and CL2 are released at the EV mode and the continuous mode, the first clutch CL1 is operated at the direct-coupling of the parallel mode, and the second clutch CL2 is operated at the OD of the parallel mode. At this time, under drive, direct-coupling drive and over drive can be achieved according to gear ratios of first and second intermediate gears CG1 and CG2 and the drive gear DG of the reduction speed gear unit CGU engaged with the first and second output gears OG1 and OG2 at the direct-coupling of the parallel mode.

Hereinafter, flow of torque at each mode in the transmission system of the hybrid electric vehicle according to various embodiments of the present invention will be described, referring to FIG. 3 to FIG. 6.

Figure 3:
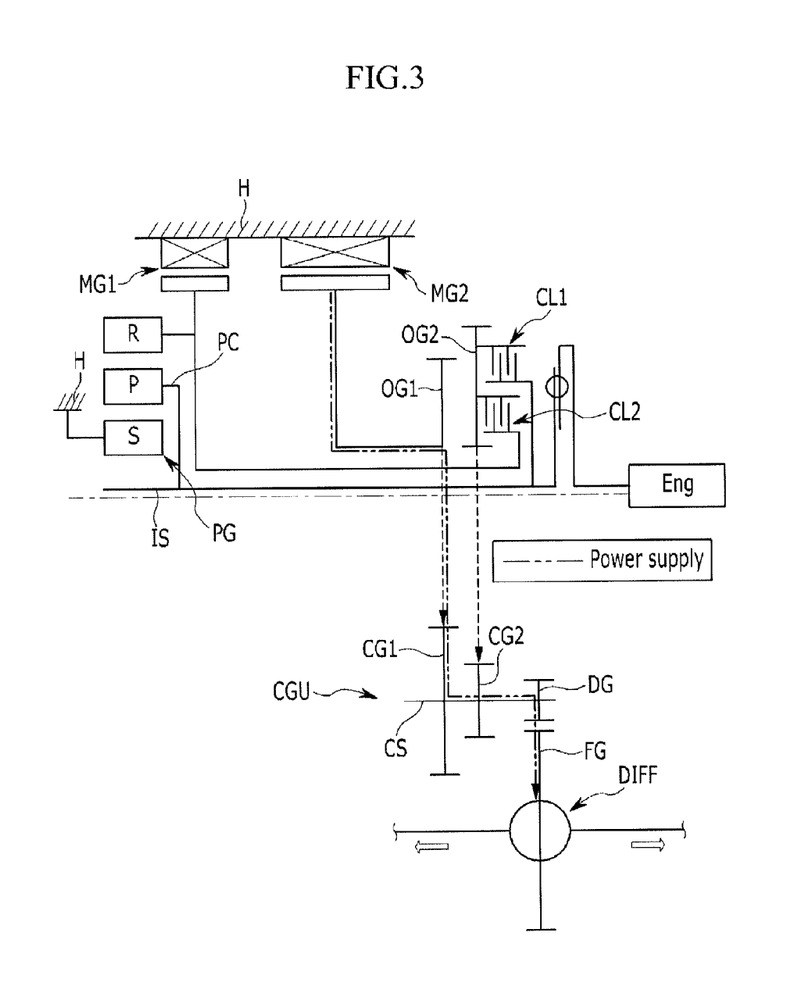
FIG. 3 is a schematic diagram illustrating flow of power at EV mode in an exemplary transmission system of a hybrid electric vehicle according to the present invention.

FIG. 3 is a schematic diagram illustrating flow of power at EV mode in a transmission system of a hybrid electric vehicle according to various embodiments of the present invention. Referring to FIG. 3, all the clutches are released at the EV mode.

The engine Eng is stopped, the planetary gear set PG is not directly involved in a shift, and rotation speed of the second motor/generator MG2 is directly input to the first output gear OG1 at the EV mode. Therefore, electric continuously variable shift may be achieved at the EV mode. That is, the torque of the second motor/generator MG2 is transmitted to the final reduction gear FG of the differential apparatus DIFF through the first output gear OG1, the first intermediate gear CG1, and the drive gear DG.

Figure 4:
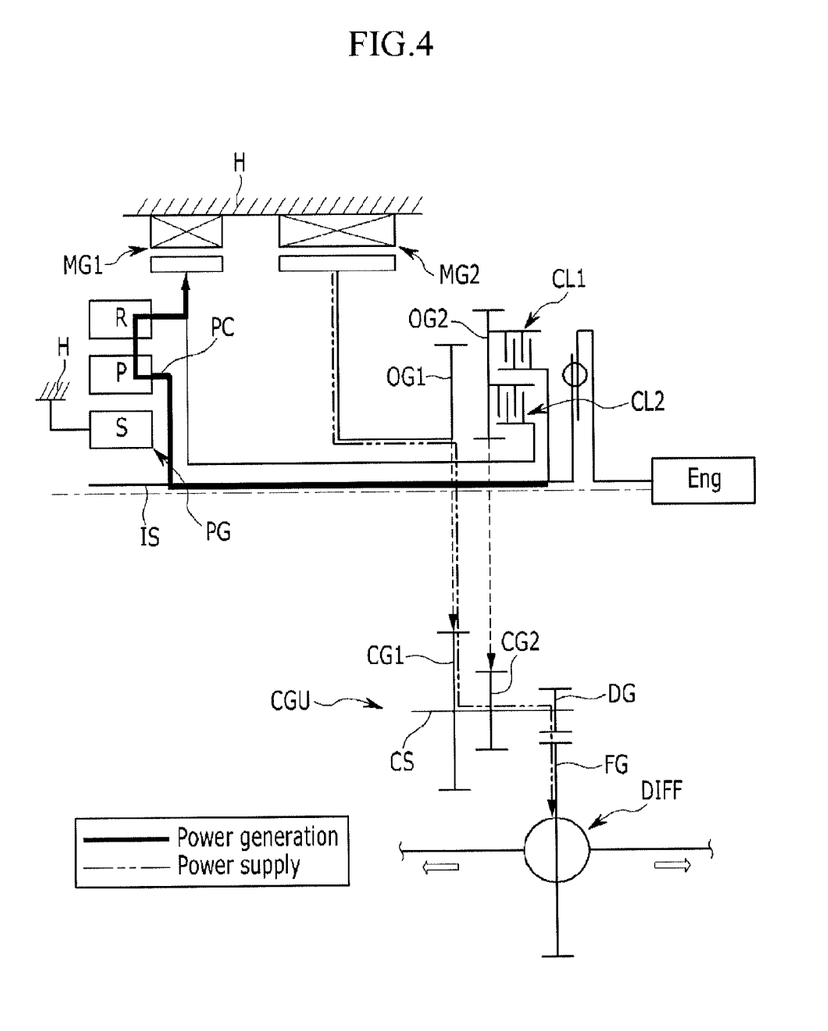
FIG. 4 is a schematic diagram illustrating flow of power at continuous mode in an exemplary transmission system of a hybrid electric vehicle according to the present invention.

FIG. 4 is a schematic diagram illustrating flow of power at continuous mode in a transmission system of a hybrid electric vehicle according to various embodiments of the present invention. Referring to FIG. 4, all the clutches are released at the continuous mode.

If the engine Eng is started at the EV mode, the continuous mode is achieved. Electricity generated by the first motor/generator MG1 is supplied to the second motor/generator MG2 as drive power at the continuous mode. At this time, the engine Eng is started by the first motor/generator MG1. That is, if the first motor/generator MG1 is operated and the torque of the first motor/generator MG1 is input to the ring gear R of the planetary gear set PG, the sun gear S is operated as a fixed element and increased torque is output through the planet carrier PC. Torque for starting the engine Eng is supplied to the engine Eng through the input shaft IS connected to the planet carrier PC, and the engine Eng is started.

After the engine Eng is started, the first motor/generator MG1 is not operated and the first motor/generator MG1 generates electricity by receiving the increased speed of the engine Eng through the ring gear R.

The planetary gear set is not directly involved in the shift, and the electric continuously variable shift may be achieved by output of the second motor/generator MG2 at the continuous mode. At this time, the planetary gear set PG is involved only in the starting of the engine Eng and power generation of the first motor/generator MG1. That is, the torque of the second motor/generator MG2 is directly output to the first output gear OG1 at the continuous mode as in the EV mode.

Therefore, the torque of the second motor/generator MG2 is transmitted to the final reduction gear FG of the differential apparatus DIFF through the first output gear OG1, the first intermediate gear CG1, and the drive gear DG. At this time, the second motor/generator MG2 uses the electricity generated by the first motor/generator MG1 as the drive power. In addition, remaining electricity is charged in the battery.

Figure 5:
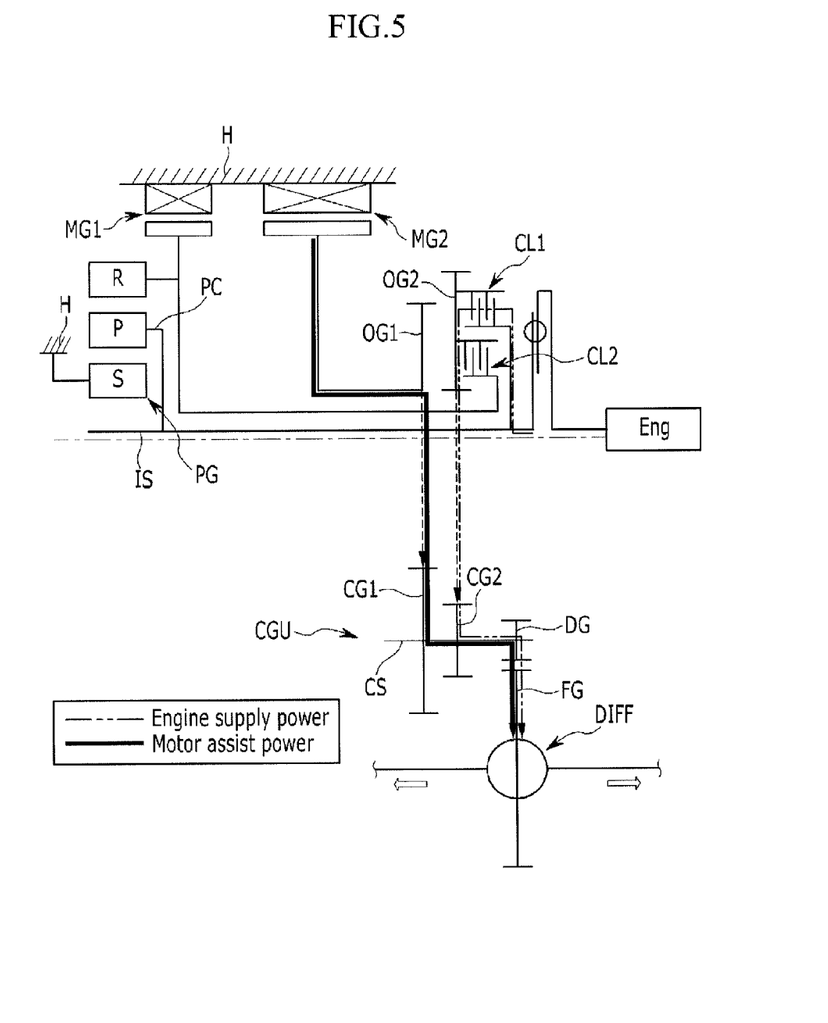
FIG. 5 is a schematic diagram illustrating flow of power at direct-coupling of parallel mode in an exemplary transmission system of a hybrid electric vehicle according to the present invention.

FIG. 5 is a schematic diagram illustrating flow of power at direct-coupling of parallel mode in a transmission system of a hybrid electric vehicle according to various embodiments of the present invention. Referring to FIG. 5, the first clutch CL1 is operated at the direct-coupling of the parallel mode.

The torque of the engine Eng is used as main power and the torque of the second motor/generator MG2 is used as auxiliary power at the direct-coupling of the parallel mode. That is, the torque of the engine Eng is supplied as the main power to the second output gear OG2 through the input shaft IS by operation of the first clutch CL1, and the torque of the second motor/generator MG2 is supplied to the first output gear OG1 as the auxiliary power. At this time, a portion of the torque of the engine Eng may be involved in the power generation of the first motor/generator MG1.

The planetary gear set is not directly involved in the shift, and the electric continuously variable shift may be achieved by the torque of the engine Eng transmitted to the second output gear OG2 through the input shaft IS and the torque of the second motor/generator MG2 transmitted to the first output gear OG1 at the direct-coupling of the parallel mode.

As described above, the torques of the second motor/generator MG2 and the engine Eng input to the first and second output gears OG1 and OG2 are transmitted to the final reduction gear FG of the differential apparatus DIFF through the first and second intermediate gears CG1 and CG2 and the drive gear DG.

Figure 6:
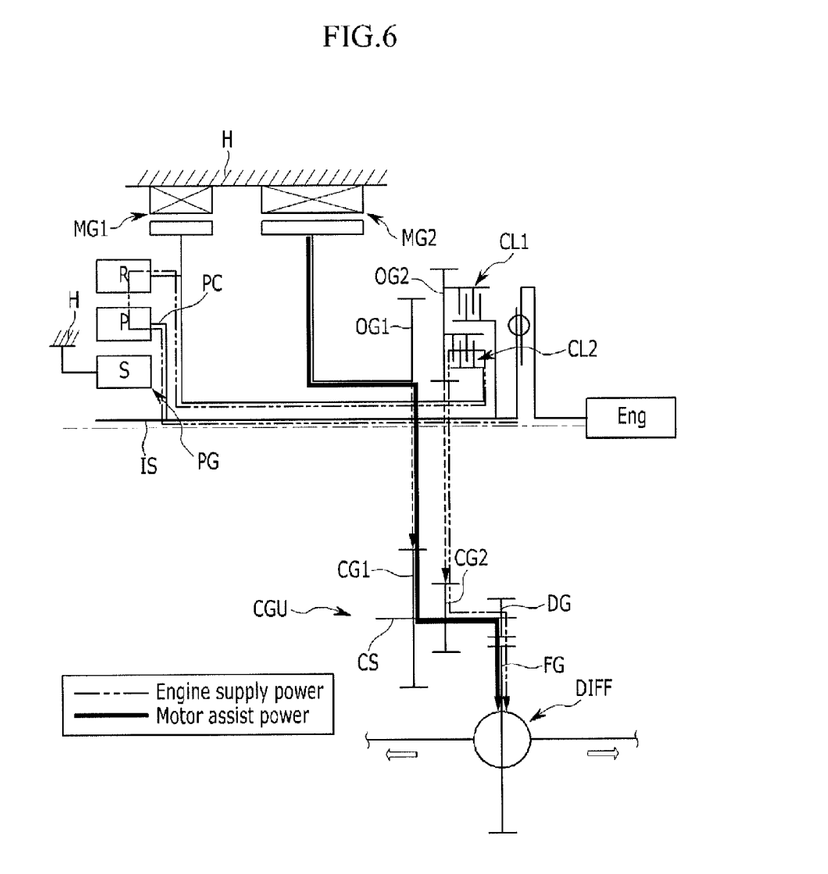
FIG. 6 is a schematic diagram illustrating flow of power at OD of parallel mode in an exemplary transmission system of a hybrid electric vehicle according to the present invention.

FIG. 6 is a schematic diagram illustrating flow of power at OD of parallel mode in a transmission system of a hybrid electric vehicle according to various embodiments of the present invention. Referring to FIG. 6, the second clutch CL2 is operated at the OD of the parallel mode.

The torque of the engine Eng is used as the main power and the torque of the second motor/generator MG2 is used as the auxiliary power at the OD of the parallel mode. That is, if the torque of the engine Eng is input to the planet carrier PC of the planetary gear set PG through the input shaft IS by operation of the second clutch CL2, the sun gear S is operated as a fixed element and the increased speed is transmitted as the main power to the second output gear OG2 through the ring gear R. Simultaneously, the torque of the second motor/generator MG2 is transmitted to the first output gear OG1 as the auxiliary power. At this time, the portion of the torque of the engine Eng may be involved in the power generation of the first motor/generator MG1.

The planetary gear set is not directly involved in the shift, and the electric continuously variable shift may be achieved by the torque of the engine Eng transmitted to the second output gear OG2 through the input shaft IS and the planetary gear set PG and the torque of the second motor/generator MG2 transmitted to the first output gear OG1 at the OD of the parallel mode.

As described above, the torques of the second motor/generator MG2 and the engine Eng input to the first and second output gears OG1 and OG2 are transmitted to the final reduction gear FG of the differential apparatus DIFF through the first and second intermediate gears CG1 and CG2 and the drive gear DG.

Therefore, all of the engine Eng, the first motor/generator MG1 and the second motor/generator MG2 can generate driving torque, the first motor/generator MG1 can generate electricity by using the torque of the engine Eng, and continuous gear ratios required in the vehicle can be formed by control of the second motor/generator MG2. Therefore, fuel economy may be improved. That is, the EV mode, the continuous mode and the parallel mode including the direct-coupling and the OD can be achieved by disposing two motor/generators MG1 and MG2 and two clutches CL1 and CL2 on the input shaft.

In addition, since clutches are not used at modes other than the parallel mode, operating pressure applied to the clutches can be minimized and fuel economy may be improved. Moreover, since the direct-coupling is added in the parallel mode, fuel economy may be enhanced and capacity of the first motor/generator MG1 may be reduced. Further, since the OD is achieved by using the planetary gear set PG, a conventional output gear set for achieving the OD can be removed and a length of the transmission may be shortened.

For convenience in explanation and accurate definition in the appended claims, the terms "externally" or "internally", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission system of a hybrid electric vehicle comprising:
   an input shaft connected to an engine;
   first and second motors/generators disposed on a transmission housing;
   a planetary gear set disposed on the input shaft and having three rotation elements, wherein a sun gear is connected to the transmission housing, a first rotation element is connected to the input shaft, and a second rotation element is connected to the first motor/generator and operated as an output element;
   a first output gear disposed on the input shaft and connected to the second motor/generator;
   a second output gear disposed on the input shaft;
   a first clutch selectively connecting the second output gear to the input shaft; and
   a second clutch selectively connecting the second output gear to the second rotation element of the planetary gear set,
   wherein the second clutch directly connects the second output gear to the second rotation element of the planetary gear set.

2. The transmission system of claim 1, wherein the planetary gear set is a single pinion planetary gear set including the sun gear, a planet carrier and a ring gear, wherein the planet carrier and ring gear are respectively the first and second rotation elements thereof, wherein the sun gear is fixed to the transmission housing, the planet carrier is directly connected to the input shaft, and the ring gear is directly connected to the first motor/generator and is selectively connected to the second output gear through the second clutch.

3. The transmission system of claim 1, further comprising:
   a reduction speed gear unit including an intermediate shaft, wherein the intermediate shaft is disposed substantially in parallel with the input shaft and, wherein the reduction speed gear unit is disposed between the first and second output gears and a final reduction gear of a differential apparatus to transmit toques of the first and second output gears to the differential apparatus.

4. The transmission system of claim 3, wherein the reduction speed gear unit comprises:
   a first intermediate gear disposed on the intermediate shaft and externally meshed with the first output gear;
   a second intermediate gear disposed on the intermediate shaft and externally meshed with the second output gear; and
   a drive gear disposed on the intermediate shaft and externally meshed with the final reduction gear of the differential apparatus.

5. The transmission system of claim 1, wherein the first and second output gears and the first and second clutches are disposed between the planetary gear set and the engine.

6. A transmission system of a hybrid electric vehicle comprising:
   an input shaft connected to an engine;
   first and second motors/generators disposed on a transmission housing;
   a planetary gear set disposed on the input shaft and having two rotation elements, wherein a sun gear is connected to the transmission housing, a first rotation element of the two rotation elements is connected to the input shaft, and a second rotation element of the two rotation elements is connected to the first motor/generator;
   a first output gear connected to the second motor/generator and outputting torque;
   a second output gear outputting torque independently from the first output gear;
   a first clutch selectively connecting the second output gear to the input shaft; and
   a second clutch selectively connecting the second output gear to the second rotation element of the planetary gear set, wherein the second clutch directly connects the second output gear to the second rotation element of the planetary gear set.

7. The transmission system of claim 6, wherein the planetary gear set is a single pinion planetary gear set including a sun gear, a planet carrier and a ring gear as the three rotation elements thereof, wherein the sun gear is fixed to the transmission housing, the planet carrier is directly connected to the input shaft, and the ring gear is directly connected to the first motor/generator and is selectively connected to the second output gear through the second clutch.

8. The transmission system of claim 6, further comprising a reduction speed gear unit including an intermediate shaft, wherein the intermediate shaft is disposed substantially in parallel with the input shaft and, wherein the reduction speed gear unit is disposed between the first and second output gears and a final reduction gear of a differential apparatus to transmit the torques of the first and second output gears to the differential apparatus.

9. The transmission system of claim 8, wherein the reduction speed gear unit comprises:
   a first intermediate gear disposed on the intermediate shaft and externally meshed with the first output gear;
   a second intermediate gear disposed on the intermediate shaft and externally meshed with the second output gear; and
   a drive gear disposed on the intermediate shaft and externally meshed with the final reduction gear of the differential apparatus.

10. The transmission system of claim 1, wherein the first and second output gears, and the first clutch and the second clutch are disposed between the planetary gear set and the engine.

11. A transmission system of a hybrid electric vehicle comprising:
    an input shaft connected to an engine;
    first and second motors/generators disposed on a transmission housing;
    a planetary gear set including first, and second rotation elements and a sun gear, wherein the sun gear is fixed to the transmission housing, the first rotation element is connected to the input shaft, and the second rotation element is connected to the first motor/generator;
    a first output gear connected to the second motor/generator and outputting torque;
    a second output gear outputting torque independently from the first output gear; and
    a first clutch selectively connecting the second output gear to the input shaft; and
    a second clutch selectively connecting the second output gear to the second rotation element of the planetary gear set,
    wherein the second clutch directly connects the second output gear to the second rotation element of the planetary gear set.

12. The transmission system of claim 11, wherein the planetary gear set is a single pinion planetary gear set, and wherein the first rotation element is a sun gear, the second rotation element is a planet carrier, and the third rotation element is a ring gear.

13. The transmission system of claim 11, further comprising a reduction speed gear unit including an intermediate shaft, wherein the intermediate shaft is disposed substantially in parallel with the input shaft and, wherein the reduction speed gear unit is disposed between the first and second output gears and a final reduction gear of a differential apparatus to transmit the torques of the first and second output gears to the differential apparatus.

14. The transmission system of claim 13, wherein the reduction speed gear unit comprises:
    a first intermediate gear disposed on the intermediate shaft and externally meshed with the first output gear;
    a second intermediate gear disposed on the intermediate shaft and externally meshed with the second output gear; and
    a drive gear disposed on the intermediate shaft and externally meshed with the final reduction gear of the differential apparatus.

15. The transmission system of claim 11, wherein the first and second output gears and the first and second clutches are disposed between the planetary gear set and the engine.

* * * * *